Nov. 5, 1968

H. J. HARP ET AL 3,409,224

FLEXIBLE DRINKING TUBE

Filed March 13, 1967

INVENTORS
HARRY J. HARP
WALTER T. LEIBLE
WILLIAM M. McCORT

BY

ATTORNEY

Nov. 5, 1968

H. J. HARP ET AL 3,409,224

FLEXIBLE DRINKING TUBE

Filed March 13, 1967

INVENTORS
HARRY J. HARP
WALTER T. LEIBLE
WILLIAM M. McCORT
BY
ATTORNEY

United States Patent Office 3,409,224
Patented Nov. 5, 1968

3,409,224
FLEXIBLE DRINKING TUBE
Harry J. Harp, Jenkintown, Walter T. Leible, Conshohocken, and William M. McCort, Warminster, Pa., assignors to Union Carbide Corporation, a corporation of New York
Filed Mar. 13, 1967, Ser. No. 622,594
10 Claims. (Cl. 239—33)

ABSTRACT OF THE DISCLOSURE

A drinking tube made from thermoplastic material with a flexible zone intermediate its ends which is formed by providing a plurality of circumferential grooves having sides of unequal length and then contracting the tube lengthwise with the grooves forming reentrant overlapping folds.

Specification

The present invention pertains to drinking tubes or straws, and more specifically to provision of a flexible zone in tubes formed of thermoplastic material.

Background of the invention

Flexible drinking straws have found consumer acceptance and utility, and their use may be particularly commodious when imbibing fluids such as ordinary beverages, under awkward, cumbersome conditions. Heretofore, flexible straws have been made largely of paper and like materials, and a variety of structural configurations and manufacturing methods have been proposed and utilized in connection with providing flexibility in such paper straws. With the advent of thermoplastic materials, such as polypropylene, and their utilization in the manufacture of drinking tubes, a need arises for improved techniques and structures in the formation of a flexible zone in these tubes. The techniques and configurations proposed in connection with paper straws have been found inappropriate in connection with formation of a flexible thermoplastic drinking tube. For many reasons, the difference in the characteristics of the materials involved makes problematic the achievement of acceptable results. Furthermore, thermoplastic materials comprise inherent characteristics which make possible the attainment of a superior product having improved features not only of a practical and utilitarian nature, but also providing a more attractive consumer item having enhanced marketability. However, in order to adequately develop the product potential of flexible thermoplastic drinking tubes, new, especially suitable approaches to the formation of a flexible zone must be provided.

Accordingly, it is an object of the present invention to provide an improved flexible tube, particularly a drinking tube, which is especially adapted for advantageous utilization of thermoplastic material.

Summary of the invention

Briefly, the present invention comprises a thermoplastic drinking tube having a flexible zone formed of a plurality of circumferential folds. The folds comprise circumferential grooves whose sides are of unequal length and are made reentrant and overlapping by lengthwise contraction of the tube. During use, flexibility is achieved by expanding the tube lengthwise by partially unfolding the grooves.

The invention provides a flexible drinking tube configuration which is advantageously adaptable to desirable manufacturing techniques. The grooves can be simply and efficiently formed, and mass production methods could probably be readily utilized. Additionally, a product comprising significantly attractive features can be provided. The tube of the present invention can be stored for extended periods without significantly impairing the flexibility thereof. Furthermore, when the tube is bent it will retain its shape without being held by the user.

Brief description of the drawing

A better understanding of the invention may be had by reference to the following detailed description of a preferred embodiment thereof taken in connection with the accompanying drawings wherein.

Description of the preferred embodiment

Figure 4:
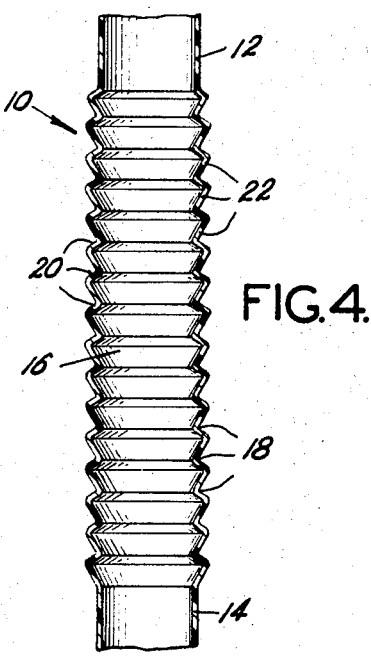
FIGURE 4 is a cross-sectional view of the tube as shown in FIGURE 1.

The drawings illustrate a polypropylene flexible drinking tube 10 comprising two straight cylindrical end sections 12 and 14 with a flexible zone 16 therebetween. Although polypropylene is specifically mentioned, any suitable thermoplastic such as those categorized as synthetic organic resins, e.g. polyethylene, polystyrene, etc. may be utilized. The flexible zone 16 is comprised of a plurality of circumferential grooves 18, each of which comprise two sides 20 and 22. The sides 20 and 22 are of differing lengths and, as most clearly illustrated in FIGURES 1 and 4, the side 22 is formed of a greater length than the side 20.

Figure 2:
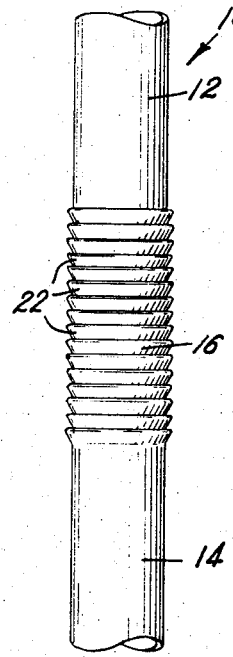
FIGURE 2 is a broken view showing the tube in a contracted position.
Figure 5:
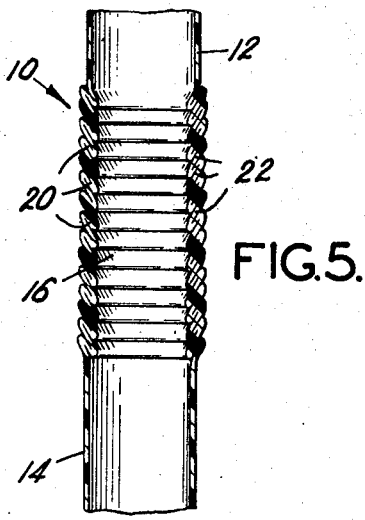
FIGURE 5 is a cross-sectional view of the tube as shown in FIGURE 2.

The tube 10 is contracted lengthwise and this may be accomplished by applying an axially compressive force to the ends of the tube. FIGURE 2 shows the tube 10 contracted lengthwise. This position is achieved and held primarily due to the fact that the sides 20 and 22 of grooves 18 are formed of different lengths. When an axially compressive force is applied to the tube 10 the flexible zone 16 contracts lengthwise with the sides 20 and 22 being placed in a reentrant and overlapping position. As most clearly illustrated in FIGURE 5, when the tube 10 is contracted lengthwise, the sides 20 and 22 overlap thereby forming a plurality of circumferential folds. The nature of the invention illustrated herein is such that once the tube 10 has been placed in the contracted position illustrated in FIGURES 2 and 5, it will remain in that position unless a force is applied to unfold the grooves 18 thereby to expand lengthwise all or part of the flexible zone 16.

Figure 3:
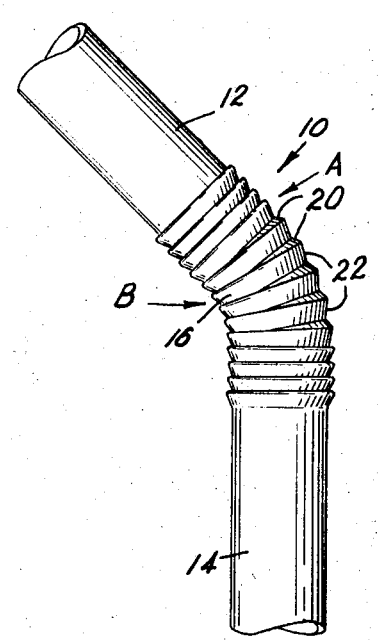
FIGURE 3 is a broken view illustrating the tube in a bent position.

FIGURE 3 shows the tube 10 of the present invention in a bent position. This position may be achieved by applying to the tube 10 a slight manual force in an appropriate manner. When this is done, it will be noted that the inner radius A of the flexible zone 16 assumes a configuration different from the outer radius B. The grooves 18 along the inner radius A remain in a folded condition with the sides 20 and 22 overlapping, while along the outer radius B the grooves 18 become unfolded with the sides 20 and 22 disposed from their overlapping position. With the tube 10 bent as indicated in FIGURE 3 the portion of the flexible zone 16 along the inner radius A is somewhat further compressed and contracted while the portion thereof along the outer radius B becomes somewhat expanded due to the tendency for the grooves 18 to unfold and the sides 20 and 22 to be displaced from their overlapping position. The nature of the invention is such that once placed in a bent position, the tube 10 will remain bent without being held by the user. This tendency of the tube to hold its bent position will operate over a relatively wide range of angles, i.e., between the straight, unbent position and a position wherein the tube is bent 180° with portion 12 parallel to and alongside portion 14.

An important element in imparting flexibility to the tube 10 is the action of axially contracting the tube lengthwise. Although a method of forming the grooves 18 will be described in detail hereinafter, it is important here to note that the contraction lengthwise of the tube 10 after initial formation of the grooves 18 contributes in an important manner to imparting flexibility to the tube 10. The initial contraction of the tube serves as a finishing step in the formation of the grooves 18. By folding or collapsing the grooves 18, the thermoplastic material is pressed or deformed toward a desired shape with the material being constrained toward that shape, thereby tending to lock-in the tube flexibility. Additionally, it will be clear that if the tube 10 is retained in the axially contracted condition the material will continue to be constrained toward this shape thereby making it possible to store the tube 10 for extended periods without significant loss of flexibility. Of course, once formed the tube may be expanded lengthwise to the condition depicted in FIGURE 1 and still be bent from that condition. However, far greater flexibility retention characteristics will result with the tube stored in its contracted condition.

Figure 6:
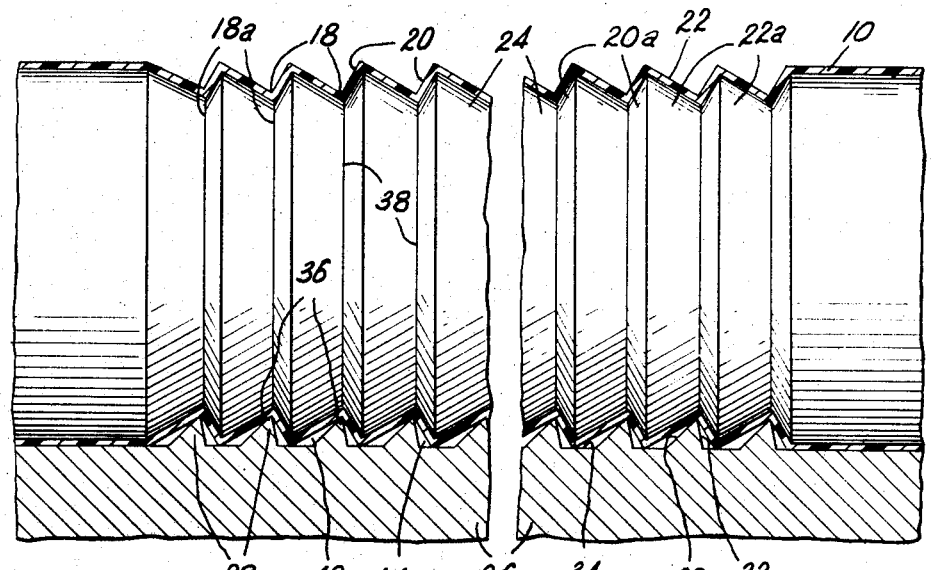
FIGURE 6 is a cross-sectional view illustrating the drinking tube of the present invention during formation and showing apparatus which may be utilized therefor.

FIGURE 6 illustrates a method and apparatus for forming the flexible zone 16 with the grooves 18 in the tube 10 wherein a straight cylindrical unflexible thermoplastic tube is first placed over a mandrel 24 which is formed with a plurality of grooves 18a each having sides 20a and 22a. After being placed around the mandrel, and during the forming operation, the tube 10 is made to conform to the shape of the mandrel 24 with the grooves 18 being conformed to the shape of grooves 18a, while sides 20 and 22 are made to conform respectively to sides 20a and 22a. As indicated in FIGURE 6, side 22a is greater in length than side 20a and it will be apparent therefore that side 22 of groove 18 will be greater in length than side 20, as previously described.

The outer diameter of the mandrel 24 is slightly smaller than the inner diameter of the tube 10 so that the mandrel may be conveniently placed within the tube 10 but with a snug fit. After the tube 10 is placed upon the mandrel 24, the tube and mandrel are placed upon a block 26 which comprises a plurality of up-standing teeth 28 formed with two sides 30 and 32 and with a flat land portion 34 therebetween. The mandrel 24 with the tube 10 thereon is then pressed against the plate 26 while being rolled over teeth 28. After several revolutions of the mandrel 24, the tube 10 will be shaped to conform to the shape of the grooves 18 by the action of the teeth 28 pressing radially inwardly upon the tube 10 to form the grooves 18 with sides 20 and 22 conforming to sides 20a and 22a respectively. During rolling, and with the mandrel 24 and the plate 26 pressed together, the apex 36 of the teeth 28 is urged toward the small diameter portion 38 of grooves 18a, and after several revolutions of the mandrel 24 with sufficient pressure applied thereto compressing the mandrel 24 against the plate 26, the tube 10 will have the flexible zone 16 formed therein with the shape thereof conforming to the shape of the mandrel 24.

Figure 1:
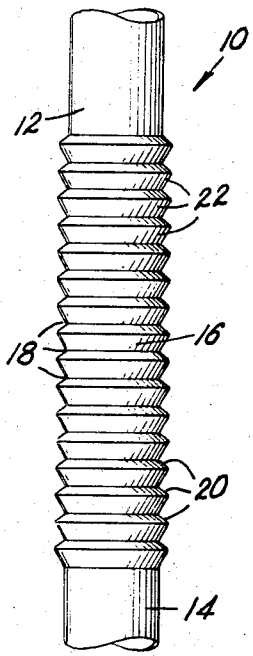
FIGURE 1 is a broken view showing the drinking tube of the present invention in an expanded position.

After rolling and pressing between the mandrel 24 and the plate 26, the tube 10 is removed from mandrel 24 and will comprise the shape or configuration indicated in FIGURE 1, previously described. Subsequently, the tube 10 has an axial compressive force applied thereto thereby contracting the tube lengthwise with the sides 20 and 22 of the grooves 18 being placed in a reentrant overlapping position shown in FIGURE 2 and previously described.

The step of contracting the tube 10 lengthwise may be performed while the tube is on the mandrel. After formation of the grooves 18, the tube 10 is displaced axially relative to mandrel 24 so that the flexible zone 16 is aligned with a smooth portion of the mandrel 24 not comprising grooves 18a. The mandrel 24 then serves to facilitate the lengthwise contraction by providing support for the tube 10.

Figure 7:
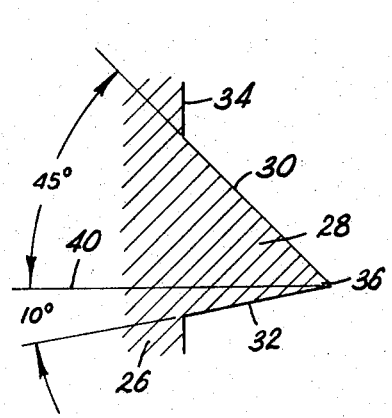
FIGURES 7 and 8 are enlarged cross-sectional views showing in greater detail portions of the apparatus illustrated in FIGURE 6.
Figure 8:
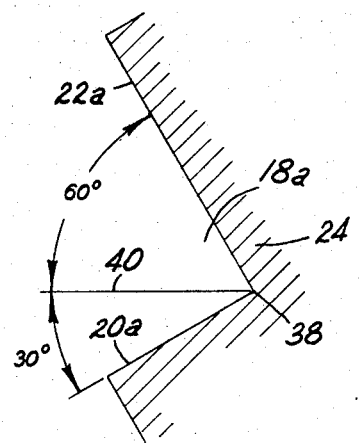

The configuration of the mandrel 24 and of the plate 26 are shown in greater detail in FIGURES 7 and 8. As indicated in FIGURE 7 the side 30 of tooth 28 extends at an angle of 45° to any line 40 which is taken perpendicular to the axis of the mandrel 24. The side 32 of tooth 28 extends at an angle of 10° with a line 40. FIGURE 8 illustrates the detailed dimensions of groove 18a, and as indicated therein the side 20a of groove 18a extends at an angle of 30° with a line 40 while side 22a extends at an angle of 60° thereto. It will be noted that the teeth 28 and the grooves 18a are formulated so that a space 42 is provided between sides 30 and 22a, while a space 44 is provided between sides 20a and 32. It has been found that the spaces 42 and 44 facilitate the formation of the flexible zone 16 in that they provide for the material thickness of the tube 10 during the forming operation.

It is to be understood that the detailed dimensional limitations described herein are intended to be exemplary only and that substantial deviation therefrom is possible without departing from the scope of the present invention. The angles between the sides 30 and 32 and between sides 20a and 22a can be varied and adjusted, as can many of the other detailed features described herein, without disadvantageously affecting the product obtained. For example, depending upon the wall thickness of the tube 10, it may be that an arrangement differing dimensionally from the arrangement described therein could be more advantageously utilized to provide an appropriate result.

Accordingly, it will be appreciated that the basic elements of the present invention reside in the configuration of the grooves 18 wherein said grooves are formed with one side of greater length than the other side, thereby enabling the grooves to be folded or collapsed with their sides overlapping and reentrant, and in the axial contraction of the flexible zone 16 which, due to the nature of the thermoplastic material, operates to lock into the tube a flexibility which may be retained over an extended storage period. With the grooves 18 in the folded or overlapping position, the grooves will tend to retain their shape and flexibility for extended periods, the marketability and storage characteristics of the item will be enhanced, and an improved, attractive consumer item may be provided.

What is claimed is:

1. A drinking tube of thermoplastic material having a flexible zone intermediate the ends thereof, said flexible zone comprising a plurality of circumferential grooves, each of said grooves having sides of unequal length, said tube being contracted lengthwise at said flexible zone with the sides of said grooves reentrant and overlapping.

2. A drinking tube according to claim 1 wherein said grooves are identical and extend completely around the periphery of said cylinder, each of said grooves having two sides with one of said sides different in length than the other.

3. A drinking tube according to claim 1 formed of polypropylene and comprising a thin-walled, small diameter cylinder having said flexible zone extending over only a minor portion of its length.

4. A drinking tube according to claim 1 wherein said reentrant overlapping sides form folds having a component of direction axially of the tube.

5. A drinking tube according to claim 4 wherein said flexible zone is expandable lengthwise by unfolding of said grooves, with partial expansion lengthwise of said flexible zone effecting axial bending of said tube.

6. The method of making a flexible thermoplastic drinking tube comprising the steps of forming intermediate the ends of said tube a plurality of circumferential grooves having sides of unequal length, and contracting said tube lengthwise.

7. The method according to claim 6 wherein said sides are formed by said contraction into reentrant overlapping folds.

8. The method according to claim 6 including the steps of mounting said tube upon a mandrel, rolling said tube and mandrel upon a plate while applying pressure therebetween, said mandrel and plate comprising appropriately shaped indentations to form in said tube during said rolling said circumferential grooves, and applying to said tube at its ends a compressive axial force to effect said lengthwise contraction.

9. The method of claim 8 wherein said axial force is applied with said tube mounted on said mandrel.

10. The method of claim 6 wherein said tube is stored in said contracted condition prior to use.

References Cited

UNITED STATES PATENTS

| | | | |
|---|---|---|---|
| 2,094,268 | 9/1937 | Friedman | 239—33 |
| 2,299,520 | 10/1942 | Yant | 264—294 |
| 2,550,797 | 5/1951 | Friedman | 239—33 |
| 2,616,129 | 11/1952 | Burton et al. | 264—320 X |
| 3,025,004 | 3/1962 | Levi | 239—33 |
| 3,168,604 | 2/1965 | Kramer et al. | 264—294 X |
| 3,326,695 | 6/1967 | Neuhauser | 239—33 |
| 3,346,187 | 10/1967 | Mueller | 239—33 |

ALLEN N. KNOWLES, *Primary Examiner.*

Disclaimer 3,409,224.—*Harry J. Harp*, Jenkintown, *Walter T. Leible*, Conshohocken, and *William M. McCort*, Warminster, Pa. FLEXIBLE DRINKING TUBE. Patent dated Nov. 5, 1968. Disclaimer filed Sept. 5, 1969, by the assignee, *Union Carbide Corporation*.

Hereby enters this disclaimer to claims 1, 2, 3, 4 and 5 of said patent.
[*Official Gazette October 14, 1969.*]